United States Patent
Sahil et al.

(10) Patent No.: US 12,061,581 B2
(45) Date of Patent: Aug. 13, 2024

(54) MATCHING OPERATION FOR A DEDUPLICATION STORAGE SYSTEM

(71) Applicant: HEWLETT PACKARD ENTERPRISE DEVELOPMENT LP, Houston, TX (US)

(72) Inventors: Aman Sahil, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 6 days.

(21) Appl. No.: 17/814,943

(22) Filed: Jul. 26, 2022

(65) Prior Publication Data
US 2024/0037078 A1    Feb. 1, 2024

(51) Int. Cl.
*G06F 16/215* (2019.01)
*G06F 16/245* (2019.01)

(52) U.S. Cl.
CPC .......... *G06F 16/215* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 7,644,107 B2 | 1/2010 | Neagovici-Negoescu et al. |
| 8,131,691 B1 | 3/2012 | Nagaralu et al. |
| 8,566,519 B2 | 10/2013 | Lay et al. |
| 8,799,238 B2 | 8/2014 | Eshghi et al. |
| 8,805,800 B2 | 8/2014 | Narasayya et al. |
| 8,949,247 B2 | 2/2015 | Torbjrnsen |
| 9,092,151 B1 * | 7/2015 | Floyd .................. G06F 16/215 |
| 9,256,368 B2 | 2/2016 | Welnicki et al. |
| 10,169,365 B2 | 1/2019 | Maheshwari |
| 10,365,974 B2 | 7/2019 | Todd et al. |
| 10,430,102 B2 | 10/2019 | Kaczmarczyk et al. |
| 10,614,038 B1 | 4/2020 | Armangau et al. |
| 10,788,988 B1 | 9/2020 | Lary et al. |
| 11,106,580 B2 | 8/2021 | Butt et al. |

(Continued)

OTHER PUBLICATIONS

Arpaci-Dusseau et al., "Scheduling: Introduction," Operating Systems: Three Easy Pieces, Chapter 7, available online at <https://web.archive.org/web/20200310015223/https://pages.cs.wisc.edu/~remzi/OSTEP/cpu-sched.pdf>. Mar. 10, 2020, 13 pages.

(Continued)

*Primary Examiner* — Kris E Mackes
*Assistant Examiner* — Cao D Vuong
(74) *Attorney, Agent, or Firm* — Trop, Pruner & Hu, P.C.

(57) ABSTRACT

Example implementations relate to metadata operations in a storage system. An example includes generating, by a storage controller of a deduplication storage system, a candidate list of container indexes for matching operations of a received data segment, each container index in the candidate list having an associated match cost; identifying, by the storage controller, a journal group associated with a first container index listed in the candidate list; reducing, by the storage controller, a match cost associated with the first container index in response to a determination that the identified journal group is in a modified state; and performing, by the storage controller, the matching operations of the received data segment based at least on the reduced match cost of the first container index.

20 Claims, 10 Drawing Sheets

(56) References Cited

U.S. PATENT DOCUMENTS

| | | |
|---|---|---|
| 11,182,256 B2 | 11/2021 | Mayo et al. |
| 11,803,518 B2 | 10/2023 | Mayo et al. |
| 2005/0165865 A1 | 7/2005 | Farmer |
| 2008/0294605 A1 | 11/2008 | Prahlad et al. |
| 2009/0307290 A1 | 12/2009 | Barsness et al. |
| 2014/0279954 A1* | 9/2014 | Aronovich ............ G06F 16/278 707/692 |
| 2018/0232286 A1 | 8/2018 | Satoyama et al. |
| 2019/0121705 A1 | 4/2019 | Mayo et al. |
| 2019/0340157 A1 | 11/2019 | Earl et al. |
| 2020/0249860 A1* | 8/2020 | Faibish ................. G06F 3/0608 |
| 2021/0011893 A1* | 1/2021 | Olson ................ H04N 21/2407 |
| 2021/0271644 A1 | 9/2021 | Chinthekindi et al. |
| 2021/0286781 A1* | 9/2021 | Dalmatov ............... G06F 16/22 |
| 2022/0237158 A1* | 7/2022 | Chen .................... H03M 7/607 |
| 2022/0374401 A1* | 11/2022 | Oberhofer ............. G06F 16/285 |

OTHER PUBLICATIONS

Avrim Blum, "Amortized Analysis," Lecture 7, available online at <https://web.archive.org/web/20200201002508/https://www.cs.cmu.edu/~avrim/451f11/lectures/lect0922.pdf>, Feb. 1, 2020, 6 pages.

Mao, B. et al.; "Read-Performance Optimization for Deduplication-Based Storage Systems in the Cloud"; Mar. 2014; 22 pages.

Prabhakaran et al., "Analysis and Evolution of Journaling File Systems," 2005, USENIX Annual Technical Conference, General Track, vol. 194, pp. 196-215.

Radu Gheorghe, "Tutorial: Logging with journald", available online at <<https://sematext.com/blog/journald-logging-tutorial/>, Apr. 28, 2020, 21 pages.

Rosenblum et al., "The Design and Implementation of a Log-Structured File System," 1992, ACM Transactions on Computer Systems, vol. 10, No. 1, pp. 26-52.

* cited by examiner

| Order | Container Index | Match Cost |
|---|---|---|
| 1 | C-4 | 0 ← 400 |
| 2 | C-7 | 0 |
| 3 | C-1 | 1 |
| 4 | C-5 | 0 |
| 5 | C-8 | 0.5 |
| 6 | C-6 | 1 |

| Order | Container Index | Match Cost |
|---|---|---|
| 1 | C-4 | 0 |
| 2 | C-7 | 0 |
| 3 | C-1 | 0.5 ← 410 |
| 4 | C-5 | 0 |
| 5 | C-8 | 0 ← 420 |
| 6 | C-6 | 1 |

MATCHING OPERATION FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 3 is an illustration of example data structures, in accordance with some implementations.

FIGS. 4A-4C are illustrations of an example candidate list, in accordance with some implementations.

Figure 1:
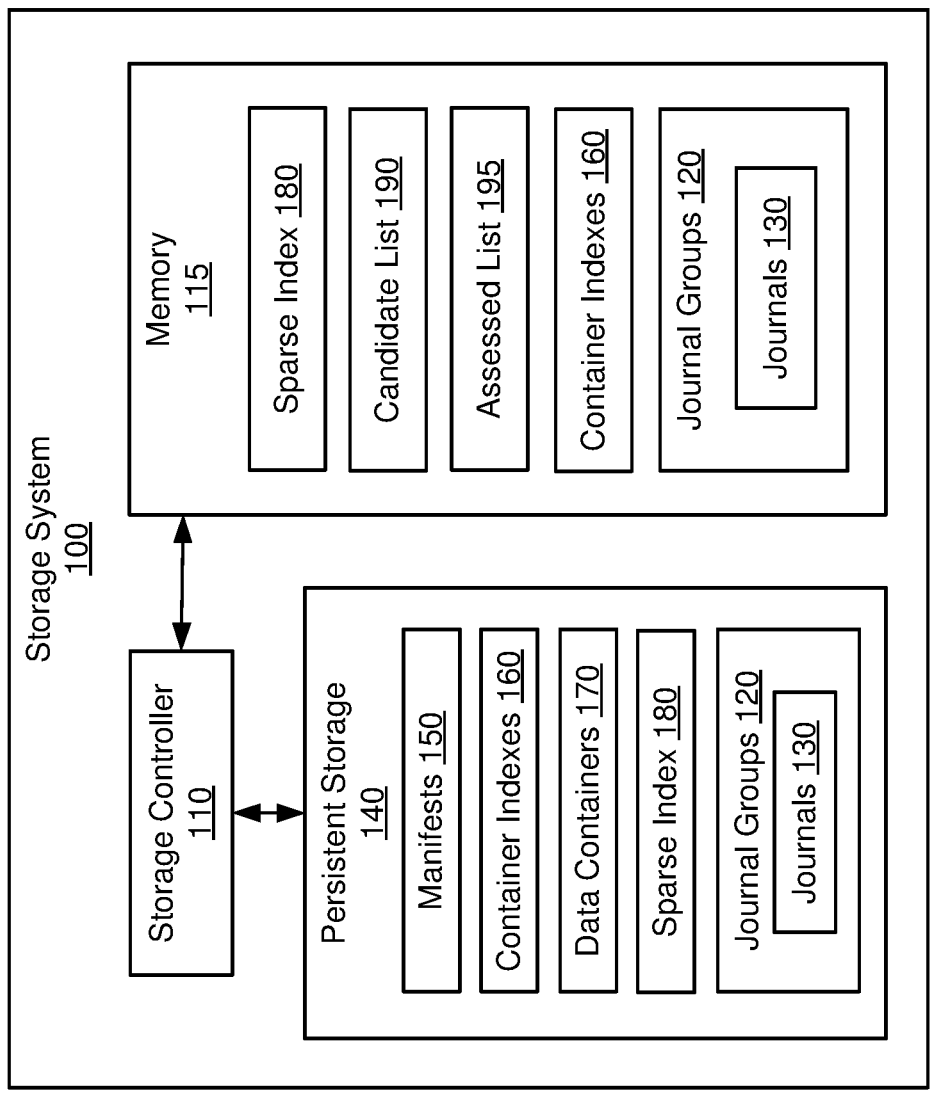
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing one or more inbound data streams (e.g., multiple concurrent inbound data streams). For example, such metadata may include data recipes (also referred to herein as "manifests") that specify the order in which particular data units are received (e.g., in a data stream). Subsequently, in response to a read request, the deduplication system may use a set of manifests to determine the received order of data units, and may thereby recreate the original data stream. Accordingly, the set of manifests may be a representation of the original data stream. The manifests may include a sequence of records, with each record representing a particular set of data unit(s). The records of the manifest may include one or more fields that identify indexes that include storage information for the data units. For example, a container index may include one or more fields that specify location information (e.g., containers, offsets, etc.) for the stored data units, compression and/or encryption characteristics of the stored data units, and so forth. The container index may include reference counts that indicate the number of manifests that reference each data unit. The metadata may be stored in persistent storage, but may be loaded into memory during use (e.g., when processing a data stream). Accordingly, the deduplication storage system may perform read input/output (I/O) operations to load the metadata from persistent storage to memory, and may perform write I/O operations to persist the metadata from memory to persistent storage.

In some examples, upon receiving a data unit (e.g., in a data stream), it may be determined whether an identical chunk is already stored in a container of the deduplication storage system. For example, the deduplication storage system may compare the fingerprint of the received data unit against the fingerprints in at least one container index. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. The ratio of the original data stream size to the size of its deduplicated representation may be referred to herein as the "deduplication ratio" of the system. The process of comparing fingerprints of one or more received data units against fingerprints of one or more container indexes may be referred to herein as a "matching operation."

In some examples, the deduplication storage system may use journals associated with container indexes. When events occur that would result in changes to the metadata stored in a container index, the container index is updated based on the changes, and the same changes may be recorded or "journaled" in a journal associated with the container index. During these updates, both the journal and the associated container index are loaded in memory. In some examples, a journal group may be formed from multiple journals, and the journal group may be written to persistent storage as a whole. In some examples, writing an entire journal group to persistent storage may be more likely to include journals that have been updated concurrently, and may thereby reduce the total number of write I/O operations from memory into persistent storage.

In some examples, it may be impractical to attempt to match all fingerprints of data units received in an incoming data stream to the fingerprints of previously stored data. For example, attempting to match all fingerprints of the received data units may consume excessive amounts of processing time and system bandwidth, and may thereby unacceptably reduce system performance. As such, the deduplication storage system may impose an upper limit on the amount of matching to be performed for received data (referred to herein as a "match budget"). In some examples, the match budget may be specified to attempt to balance the benefits of deduplication (e.g., higher deduplication ratio) and the costs of deduplication (e.g., processing time and bandwidth).

In accordance with some implementations of the present disclosure, a deduplication storage system may divide a received data stream into segments, with each segment including multiple data units. The deduplication storage system may identify a set or list of container indexes (referred to herein as the "candidate list") to use for matching operations for the segment (i.e., for fingerprints of data blocks of the segment). The deduplication storage system may then order the container indexes of the candidate list according to the predicted number of matches to be found in each candidate container index for the segment, and may estimate the bandwidth cost (referred to herein as the "match cost") for performing a matching operation for each candidate container index. In some implementations, the match cost may be limited to a minimum value of zero.

In some implementations, the deduplication storage system may load candidate container indexes, each having a respective match cost, into memory according to the order of the candidate list for matching against the data units of the segment (to determine which data units are already stored). The deduplication storage system may accumulate the match costs of each candidate container index against which the data units of the segment have been matched, and may compare the accumulated match cost to the match budget. When the accumulated match cost exceeds the match budget, the matching operation may be terminated for the segment, and any remaining data units may be stored as new data in the deduplication storage system. In this manner, some implementations may allow the deduplication storage system to trade-off or balance between the resulting deduplication ratio and the consumed processing resources.

In some implementations, the match cost of a candidate container index may be based on a current location and state of the candidate container index. For example, if a container index is present in memory and has been previously modified (i.e., is "dirty"), that container index will already need to be written to persistent storage (write I/O) to persist the previous changes. As such, the matching operation would not cause any additional read I/O (since the candidate container index is already in memory), and would not cause any additional write I/O (as additional updates due to the matching against the present segment would not incur any further write cost, since the candidate container index is already to be written to persistent storage). Accordingly, the corresponding match cost may be a relatively low value (e.g., a zero value) to indicate that no additional read or write I/Os are required for that candidate container index in this example.

Further, in some implementations, the match cost of one or more candidate container indexes may be based on a current state of a journal group associated with the one or more container indexes. For example, if a journal group in memory includes a journal that has been modified to record changes to a candidate container index, that journal group will already need to be written to persistent storage to persist the previous changes. Furthermore, since the journal group is already loaded in memory, the candidate container index is also already loaded in memory. As such, the matching operation for the candidate container index would not cause any additional read I/O (since the candidate container index is already in memory), and would not cause any additional write I/O (as additional updates due to the matching would not incur any further write cost, since the journal group is already to be written to persistent storage). Accordingly, the corresponding match cost may be a relatively low value to indicate that no additional read or write I/Os are required for the candidate container index in this example.

In another example, if a journal group in memory is determined to include a journal that has been modified to record changes to a candidate container index, the journal group may be used to identify a set of additional candidate container indexes that are associated with the journal group (i.e., other container indexes that are included in the candidate list, and that are each associated with a different journal included in that journal group). Further, for each of the set of additional candidate container indexes, the matching operation using that candidate container index would not cause any additional write I/O (as additional updates due to the matching would not incur any further write cost, since the journal group is already to be written to persistent storage). As such, for each of the set of additional candidate container indexes, the match cost of the candidate container index may be a relatively low value to indicate that no additional write I/Os are required for the candidate container index in this example. In this manner, the match costs for the set of additional candidate container indexes can more accurately reflect the estimated bandwidth cost for performing matching operations for the set of additional candidate container indexes. Accordingly, some implementations may improve the accuracy of the match costs used to control the matching operation, and may thereby improve the performance of the deduplication storage system. The disclosed technique for determining match costs is discussed further below with reference to FIGS. 1-8.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the persistent storage 140 may store various data structures including at least manifests 150, indexes 160, data containers 170, a sparse index 180, and journal groups 120. Further, the memory 115 may store various data structures including at least container indexes 160, journal groups 120, a sparse index 180, a candidate list 190, and an assessed list 195. In some examples, copies of container indexes 160, journal groups 120, and the sparse index 180 may be transferred between the memory 115 and persistent storage 140 (e.g., via read and write input/output (I/O) operations).

In some implementations, the storage system 100 may perform deduplication of stored data. For example, the storage controller 110 may receive an inbound data stream including multiple data units, and may store at least one copy of each data unit in a data container 170 (e.g., by appending the data units to the end of the data container 170). In some examples, each data container 170 may be divided into portions (also referred to herein as "entities").

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may perform a matching operation (i.e., comparing the fingerprint generated for the incoming data unit to the fingerprints in at least one container index). If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may generate a manifest 150 to record the order in which the data units were received. Further, the manifest 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the manifest 150 to determine the sequence of data units that made up the original data. The storage controller 110 may then use pointer data included in the manifest 150 to identify the container indexes 160 associated with the data units. Further, the storage controller 110 may use information included in the identified container indexes 160 (and information included in the manifest 150) to determine the locations that store the data units (e.g., data container 170, entity, offsets, etc.), and may then read the data units from the determined locations.

In some implementations, each journal group 120 may be a data structure grouping multiple journals 130. Each journal 130 may be a data structure associated with a corresponding container index 160. Further, each journal 130 may include information indicating changes to the data stored in the container index 160 associated with that journal 130. For example, when a copy of the container index 160 present in memory 115 is modified to reflect a change to the metadata, that change may also be recorded as an entry in the associated journal 130. In some implementations, multiple journals 130 may be grouped in a journal group 120 associated with a single file or object stored in the deduplication system. For example, the multiple journals may correspond to indexes storing metadata associated with a single file.

In some implementations, the sparse index 180 is a data structure including multiple entries or rows. Each entry of the sparse index 180 may map the fingerprint of a data unit to a data container 170 that includes a stored version of that data unit. For example, each entry may include some or all of a fingerprint (e.g., a full hash, a truncated hash, etc.) of the data unit. Further, each entry may include an identifier for a data container 170, and/or an identifier for a container index 160 associated with the data container 170.

In examples described herein, the sparse index 180 may not contain an entry for every fingerprint encountered for received data units, but may instead contain entries for a subset of fingerprints defined by a sparse fingerprint condition. As used herein, the term "hook points" refers to the subset of fingerprints that meet the sparse fingerprint condition. In some examples, the sparse fingerprint condition may be a condition that is met by a relatively small number of all of the possible fingerprints. For example, the sparse fingerprint condition may be whether a given fingerprint (e.g., in a binary representation) includes a particular bit pattern at a particular offset. For example, a sparse fingerprint condition may be met by each fingerprint having five zeroes ("00000") in a row starting at a given bit position (or offset) of the fingerprint (e.g., starting at the fifth bit position). In another example, the sparse fingerprint condition may be selected such that the hook points may have a desirable statistical distribution over the universe of the possible fingerprints. In still other examples, a sparse fingerprint condition may be specified based on an offset or distance between hook points (e.g., 10 data units), as an amount of data between hook points (e.g., 10 MB), as a beginning or an end of the segment, and so forth. Other suitable sparse fingerprint conditions may be used. Furthermore, in some examples described herein, a given sparse fingerprint condition may be deterministic such that the sparse fingerprint condition would always be met by the same set of fingerprints.

In some implementations, when receiving an inbound data stream, the storage controller 110 may divide the data stream into segments, with each segment including multiple data units. The segments may be defined using a segmenting algorithm. For example, each segment may include a given number of data units (e.g., 1000 data units), may have a particular data size (e.g., 500 MB), and so forth.

In some implementations, the storage controller 110 may identify a set of hook points (e.g., a set of fingerprints) in a received segment based on the sparse fingerprint condition. The hook points of a received segment may be compared to the hook points stored in the sparse index 180 maintained in memory 115. If a hook point of the received segment is matched to an entry of the sparse index 180, that entry may be used to identify a container index 160 that indicates the stored location of the associated data unit. In some implementations, the candidate list 190 may be generated from the container indexes 160 that are identified using the sparse index 180. Otherwise, if a hook point of the received segment is not included in the sparse index 180, that hook point may be added to the sparse index 180. For example, a new entry may be added to the sparse index 180 to identify the hook point and an associated data container 170 (or the associated container index 160).

In some implementations, when comparing the hook points of a segment to the sparse index 180, multiple hook points may map to the same container index 160. Therefore, some candidate container indexes 160 may be identified multiple times based on the comparison to the sparse index 180. The storage controller 110 may count the number of hook points in a segment that match a given container index 160 based on the sparse index 180. In some implementations, the candidate list 190 may be sorted in descending order of hook points (i.e., the number of hook points mapped to a given candidate container indexes 160 based on the sparse index 180). As such, the candidate list 190 may begin with the candidate container index 160 that is likely to match the largest number of data units, and may end with the candidate container index 160 that is likely to match the smallest number of data units.

In some implementations, the storage controller 110 may use the candidate list 190 to perform matching of a received data segment. For example, the storage controller 110 may iteratively load each candidate container index 160 into memory 115 (if not already included in memory 115) in the order of the candidate list 190. The storage controller 110 may generate a fingerprint for each data unit of the received segment, and may compare the generated fingerprint to the fingerprints included in the current container index 160. If a match is identified, then the storage controller 110 may determine that a duplicate of the incoming data unit is already stored by the storage system 100. Accordingly, the storage controller 110 may store a reference to the previous data unit (e.g., in a manifest 150) in deduplicated form, rather than storing a new copy of the incoming data unit. In some implementations, loading the candidate container indexes 160 into memory 115 according to the order of the candidate list 190 (i.e., in descending order of the number of hook points) may allow the largest number of fingerprint matches to occur as early as possible in the matching process, and therefore may reduce the overall time required for the matching process. Accordingly, use of the candidate list 190 may provide improved efficiency for the matching process.

In some implementations, the entries of the candidate list 190 may include or indicate the match cost of each candidate container index 160. The match cost may indicate the estimated amount of I/O bandwidth required to perform a matching operation for each candidate container index 160. In some examples, the storage controller 110 may determine the match cost based on the current location and state of the candidate container index 160. For example, the storage controller 110 may set the match cost to a relatively high value (e.g., 1) for a first container index 160 that is not currently loaded in memory 115. Since it is not currently loaded, the first container index 160 would need to be read from persistent storage 140 into memory 115, and subsequently written to persistent storage 140 from memory 115 (if it is updated based on a match being found there). In some implementations, each match cost may be limited to a minimum value of zero.

In another example, the storage controller 110 may set the match cost to a relatively low value (e.g., 0) for a second container index 160 that is currently loaded in memory 115 and that is in a modified state (i.e., is "dirty"). Since it is already loaded, matching against the second container index 160 will not cause any additional read, and in the modified state, the second container index 160 already requires a write I/O to persist previous changes, and therefore matching against the second container index 160 will not cause any additional write I/O.

In yet another example, the storage controller 110 may set the match cost to a medium value (e.g., 0.5) for a third container index 160 that is currently loaded in memory 115 but has not been modified (i.e., is "not dirty"). In such examples, the third container index 160 does not already require a write I/O to persist any previous changes. Accordingly, the matching operation for the third container index 160 would not cause a read I/O to load the third container index 160 into memory, but matching an incoming data block against the third container index 160 would cause an additional write I/O to persist the modification of the third container index 160 based on the matching operation.

In some implementations, the storage controller 110 may determine the match cost for a candidate container index 160 based on the state of an associated journal group 120. For example, if a journal group 120 in memory 115 includes a journal 130 that has been modified to record changes to a candidate container index 160, that journal group 120 will already need to be written to persistent storage 140 to persist the previous changes. Further, since the journal group 120 is already loaded in memory 115, the candidate container index 160 is also already loaded in memory 115. Accordingly, the match cost for a candidate container index 160 may be a relatively low value to indicate that no additional read or write I/Os are required for the candidate container index 160 in this example.

In some implementations, the storage controller 110 may determine the match cost for a set of additional candidate container indexes 160 based on the state of a journal group 120. For example, if it is determined that a journal group 120 includes a journal 130 that has been modified to record changes to a candidate container index 160, that journal group 120 may be used to identify a set of additional candidate container indexes 160 that are associated with the journal group 120. Since the journal group 120 is already to be written to persistent storage 140, the matching operations for the set of additional candidate container indexes 160 would not cause any additional write I/O (as additional updates due to the matching would be persisted with the journal group 120). Accordingly, the match cost for each of the set of additional candidate container indexes 160 may be a relatively low value to indicate that no additional write I/Os are required for the candidate container index 160 in this example.

Furthermore, after determining the match cost for the set of additional candidate container indexes 160 based on the state of the journal group 120, there is no longer any need to determine the match cost for the set of additional candidate container indexes 160. Accordingly, in some implementations, the storage controller 110 may update the assessed list 195 to identify the set of additional candidate container indexes 160, and may then block any further changes to the match costs for the container indexes 160 identified in the assessed list 195. In this manner, the use of the assessed list 195 may prevent duplication of the process of determining the match costs for the set of additional candidate container indexes 160.

In some implementations, the storage controller 110 may impose a match budget to limit the amount of matching to be performed for the received data. For example, when matching a received data segment against the candidate list 190, the storage controller 110 may sum or accumulate the match costs of each candidate container index 160 (e.g., as indicated in the candidate list 190) against which matching is performed, and may compare the accumulated match cost to a maximum match threshold (referred to as the "match budget"). When the total of accumulated match costs exceeds the match budget, the storage controller 110 may terminate the matching operation, and may store any remaining data units as new data units in the deduplication storage system. In this manner, the match budget may allow the matching operation to terminated without attempting to exhaustively match every single data unit, which may be inefficient. In this manner, the match budget may provide control to trade-off or balance between the deduplication ratio and the consumed processing resources of the system.

Figure 2:
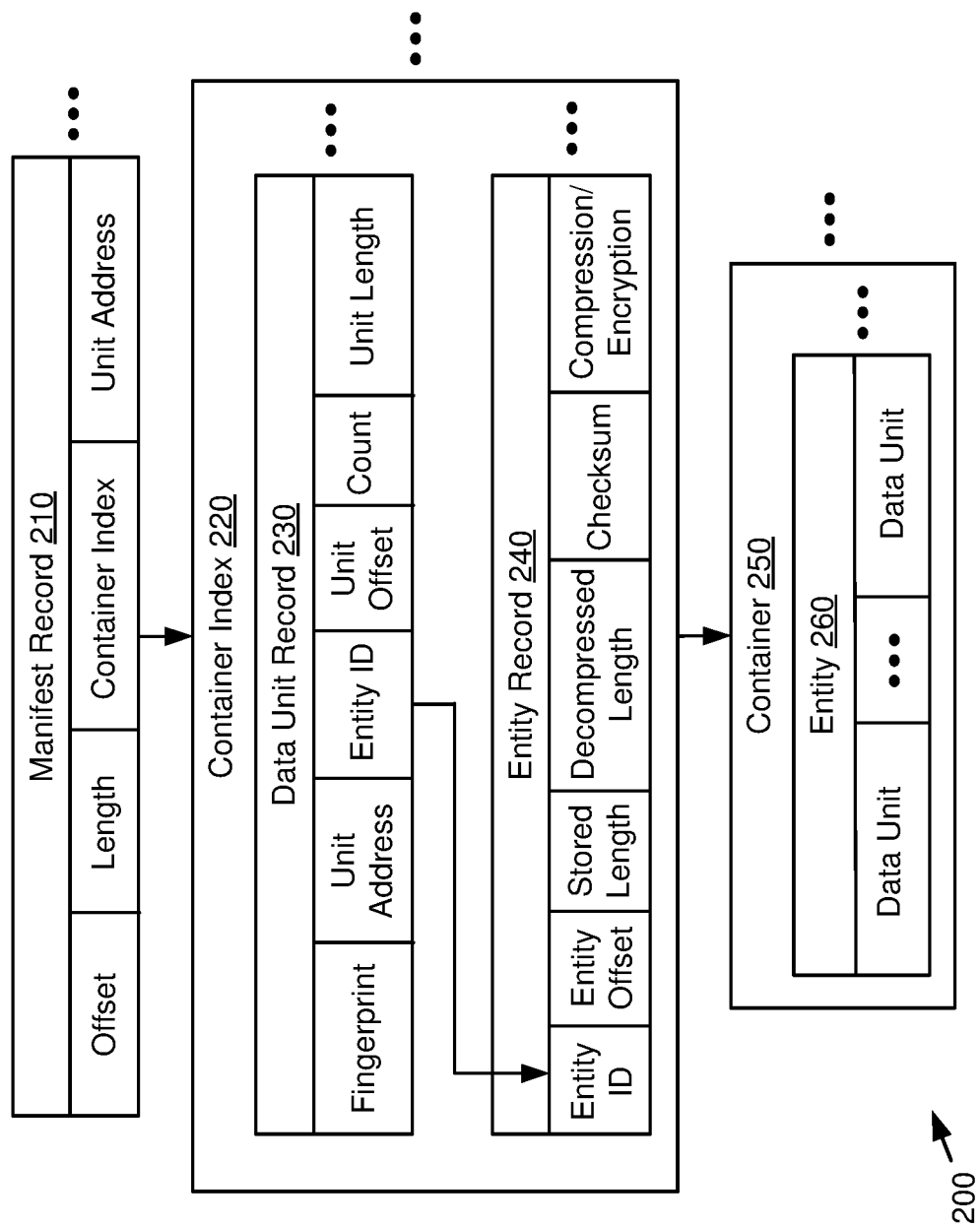
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include a manifest record 210, a container index 220, and a container 250. In some examples, the manifest record 210, the container index 220, and the container 250 may correspond generally to example implementations of a manifest 150, a container index 160, and a data container 170 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Figures 3, 4A:
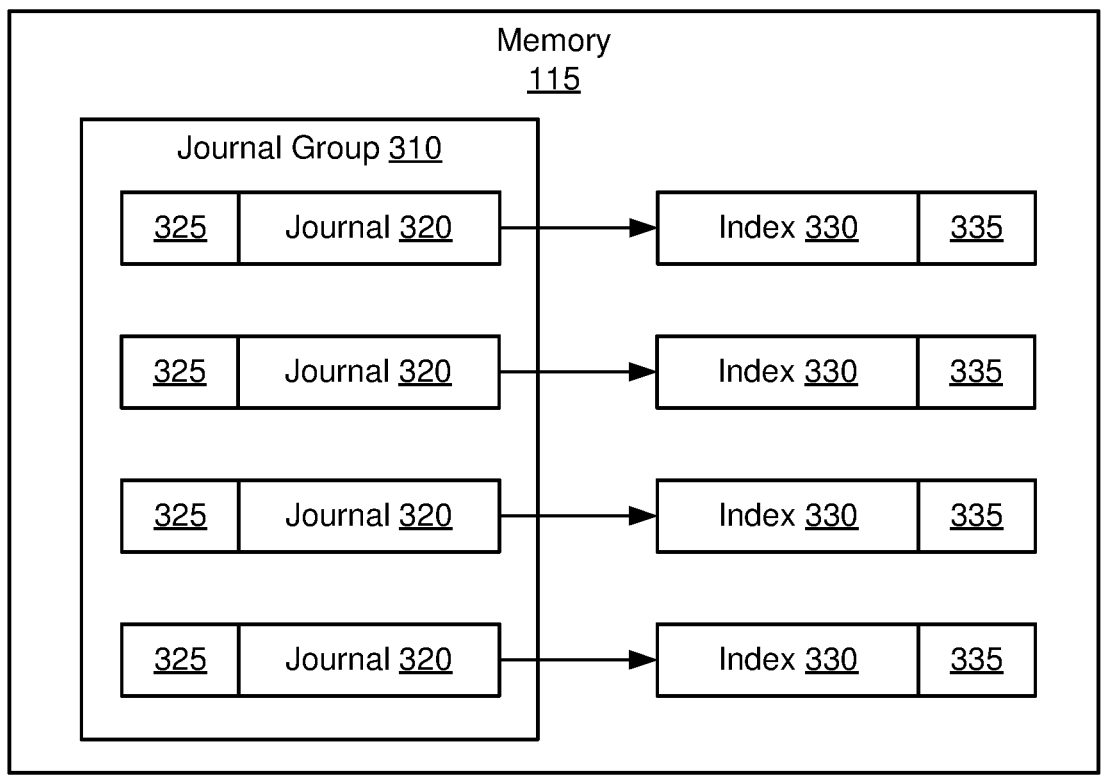

FIG. 3—Example Data Structures

Referring now to FIG. 3, shown is an illustration of the memory 115 including a journal group 310 and multiple container indexes 330. As shown, the journal group 310 includes multiple journals 320. In some examples, the journal group 310, journals 320, and container indexes 330 may correspond generally to example implementations of the journal group 120, journals 130, and container indexes 160 (shown in FIG. 1), respectively.

In some implementations, each journal 320 may be associated with a corresponding container index 330, and may record changes to the metadata stored in the corresponding container index 330. Further, each journal 320 may include or be associated with a version number 325. Each container index 330 may include or be associated with a version number 335. In some implementations, the version number 325 may be compared to the version number 335 to determine whether the journal 320 or the associated container index 330 reflects the latest version of metadata. For example, if the version number 325 is greater than the version number 335, it may be determined that the change data included in the journal 320 reflects a state of metadata that is more recent than the metadata stored in the container index 330. If so, the container index 330 may be updated to include the changes recorded in the journal 320. However, if the version number 325 is smaller than the version number 335, it may be determined that the change data included in the journal 320 reflects a state of metadata that is older than the metadata stored in the container index 330. In this situation, the journal 320 may be cleared without updating the container index 330. In some implementations, the comparison of the version number 325 to the version number 335 may be performed in response to loading the journal 320 or the associated container index 330 from persistent storage into memory (e.g., from persistent storage 140 into memory 115, as shown in FIG. 1).

In one or more implementations, the number of journals 320 included in a journal group 310 may be specified in a stored parameter (e.g., a user setting, a configuration variable, and so forth). In some examples, this parameter may be adjusted or tuned to modify the performance characteristics of input/output (I/O) operations in a storage system. For example, this parameter may be increased to attempt to obtain relatively less frequent write I/O operations of relatively larger size. In another example, this parameter may be decreased to attempt to obtain relatively more frequent write I/O operations of relatively smaller size.

FIGS. 4A-4C—Example Candidate List

Referring now to FIGS. 4A-4C, shown is an example candidate list 190 at various points in time. As shown in FIG. 4A, the candidate list 190 may include multiple entries or rows. Each entry may store a different combination of a container index identifier and a match cost. In some implementations, the entries of the candidate list 190 may be ordered in descending order of the number of hook points associated with each container index. For example, the container identifier in the first entry (i.e., C-4) may identify the container index determined to map to the most hook points (e.g., using the sparse index 180 shown in FIG. 1). Further, the container identifier in the last entry (i.e., C-6) may identify the container index determined to map to the fewest hook points. Note that, in the example shown in FIG. 4A, the candidate list 190 is not ordered according to the match costs of the container indexes. The candidate list 190 may be used to sequentially load the container indexes into memory according to the order of each entry.

In some implementations, the match cost included in the candidate list 190 may indicate the estimated amount of I/O bandwidth required to perform matching operations against the associated container indexes. The match costs may be populated into the candidate list 190 at the time of use (e.g., at the time of performing a match operation for a received segment), and may be determined based on the current locations and states of the container indexes. For example, as shown in FIG. 4A, the match cost of container index "C-4" may be populated with the value "0.5" in response to a determination that the container index "C-4" is currently loaded in memory and is not in a modified state. In another example, the match cost of container index "C-7" may be populated with the value "0" in response to a determination that the container index "C-7" is currently loaded in memory and is in a modified state (e.g., is "dirty"). In yet another example, the match cost of container index "C-1" may be populated with the value "1" in response to a determination that the container index "C-1" is not currently loaded in memory In some implementations, the match costs in one or more entries of the candidate list 190 may be adjusted based on a state of a journal group associated with a container index identified by that entry. For example, if a particular journal group associated with the container index "C-4" is currently loaded in memory and is in a modified state, that particular journal group will already need to be written to persistent storage to persist the previous changes. Accordingly, as shown in FIG. 4B, an adjustment 400 is performed to reduce the match cost for container index "C-4" from an initial value "0.5" (shown in FIG. 4A) to an adjusted value "0." Further, the particular journal group may be used to determine that the container indexes "C-1" and "C-8" are also associated with the particular journal group. Accordingly, as shown in FIG. 4C, an adjustment 410 is performed to reduce the match cost for container index "C-1" from an initial value "1" to an adjusted value "0.5." In addition, an adjustment 420 is performed to reduce the match cost for container index "C-8" from an initial value "0.5" to an adjusted value "0."

Figure 5A:
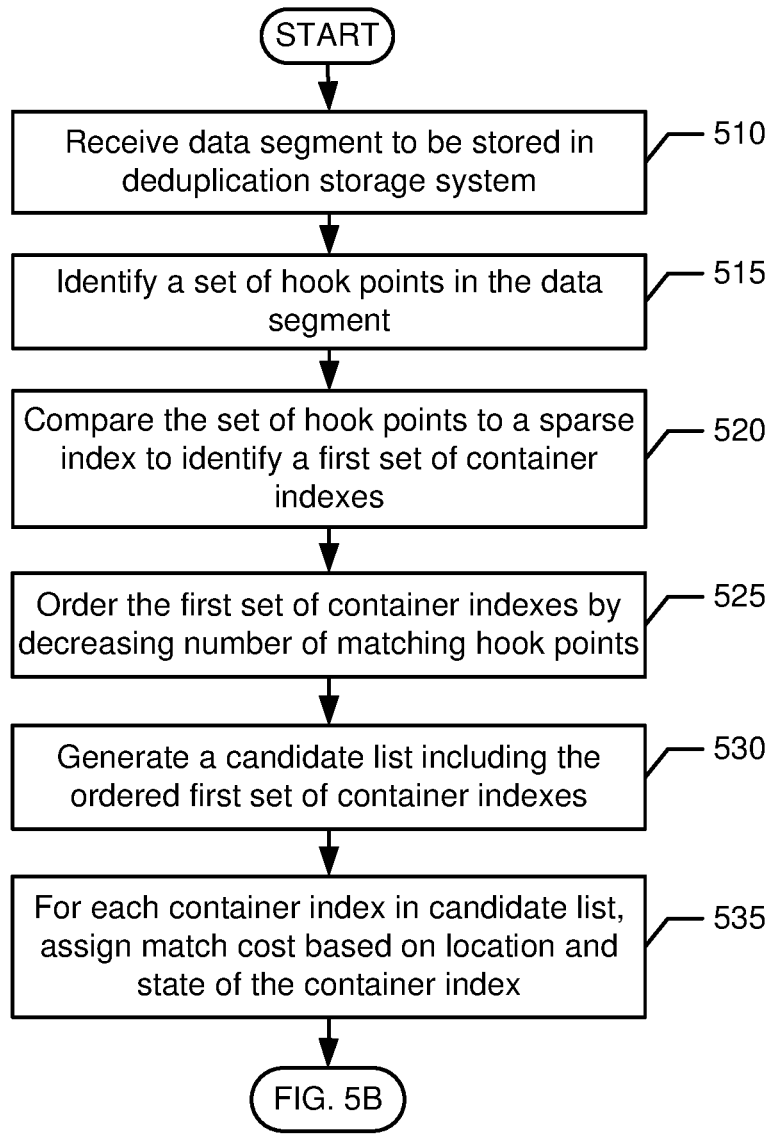
FIGS. 5A-5C are illustrations of example processes, in accordance with some implementations.
Figure 5B:
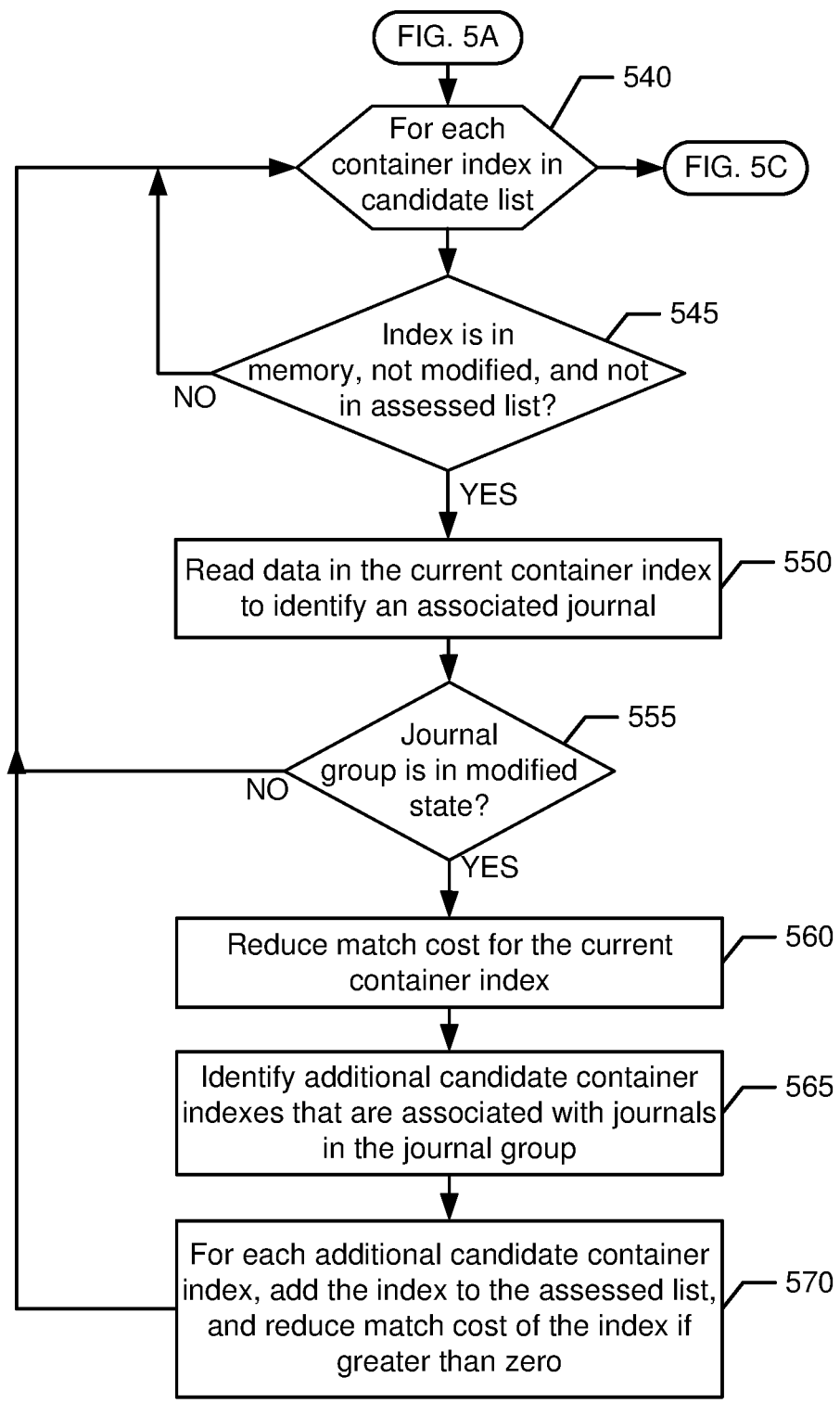
Figure 5C:
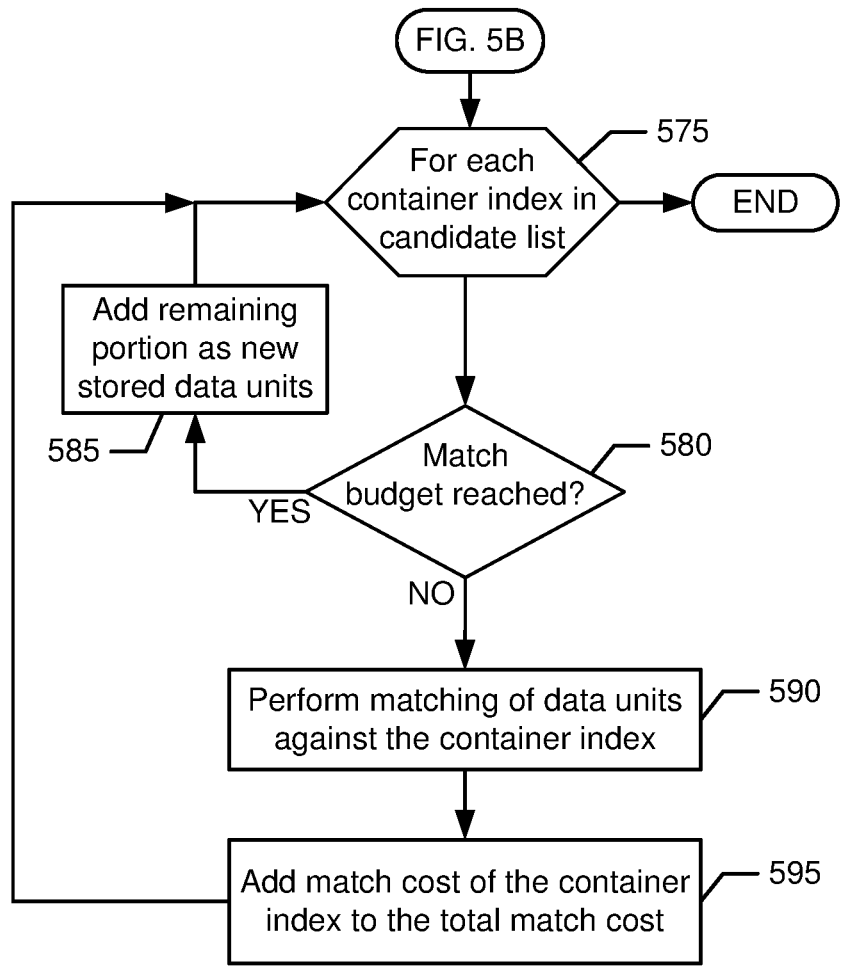

FIGS. 5A-5C—Example Processes for Data Deduplication

FIGS. 5A-5C show example processes for data deduplication, in accordance with some implementations. The example processes shown in FIGS. 5A-5C may be performed by a storage controller executing instructions (e.g., storage controller 110 shown in FIG. 1). These example processes may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the example processes may be described below with reference to FIGS. 1-4C, which show examples in accordance with some implementations. However, other implementations are also possible.

Referring now to FIG. 5A, blocks 510-535 may correspond generally to an example sub-process for generating a candidate list (e.g., candidate list 190 shown in FIG. 1).

Block 510 may include receiving a data segment to be stored in the deduplication storage system. Block 515 may include identifying a set of hook points in the data segment. For example, referring to FIG. 1, the storage controller 110 receives an inbound data stream, and divides the data stream into segments that each include multiple data units. The storage controller 110 then determines a set of hook points in each segment (e.g., based on a sparse fingerprint condition or algorithm).

Block 520 may include comparing the set of hook points to a sparse index to identify a first set of container indexes. Block 525 may include ordering the first set of container indexes by decreasing number of matching hook points. For example, referring to FIG. 1, the storage controller 110 compares a set of hook points of a received segment to the hook points stored in the sparse index 180. The storage controller 110 identifies each container index 160 that is mapped to at least one hook point of the segment in the sparse index 180. Further, the storage controller 110 counts the number of hook points that are mapped to each container index 160, and sorts the container indexes 160 according to the number of hook points.

Block 530 may include generating a candidate list including the ordered first set of container indexes. Block 535 may include, for each container index in candidate list, assigning match cost based on location and state of the container index. For example, referring to FIGS. 1 and 4A, the storage controller 110 generates a candidate list 190 that lists the set of container indexes 160 (identified at block 520) as sorted in decreasing order of the number of hook points. Further, the storage controller 110 determines a match cost for each candidate container index 160 based on whether the candidate container index 160 is loaded in memory 115, and determines whether the candidate container index 160 is in a modified state. For example, a match cost of "1" may be allocated for a candidate container index 160 that is not currently loaded in memory, a match cost of "0" may be allocated for a candidate container index 160 that is currently loaded in memory and is in a modified state, and a match cost of "0.5" may be allocated for a candidate container index 160 that is currently loaded in memory and is not in a modified state. After block 535, the process may continue at block 540 (shown in FIG. 5B).

Referring now to FIG. 5B, blocks 540-570 may correspond generally to an example sub-process for adjusting the match costs in a candidate list based on journal groups (e.g., journal group 120 shown in FIG. 1).

At block 540, a loop (defined by blocks 540-570) may be entered to process each container index in the ordered candidate list (generated at block 530 shown in FIG. 5A). Decision block 545 may include determining whether the current container index is loaded in memory, is not modified, and is not included in the assessed list. If so, the example sub-process may continue at block 550 (described below).

Otherwise, the example sub-process may return to block 540 (i.e., to process another candidate container index). For example, referring to FIG. 1, the storage controller 110 iteratively processes each container index 160 included in the candidate list 190. For each candidate container index 160, the storage controller 110 determines whether the candidate container index 160 is currently loaded in memory 115, is not currently modified, and is not identified in the assessed list 195.

Block 550 may include reading data in the current container index in memory to identify an associated journal. Decision block 555 may include determining whether the journal group that includes the associated journal is in a modified state. If so, the example sub-process may continue at block 560, which may include reducing the match cost for the current container index. Otherwise, if the journal group is not in a modified state, the example sub-process may return to block 540 (i.e., to process another candidate container index). For example, referring to FIG. 1, the storage controller 110 reads a journal identifier included in the candidate container index 160 (loaded in memory 115) to identify the journal 130 that is associated with that candidate container index 160. The storage controller 110 then identifies a journal group 120 that includes the identified journal 130, and determines that the journal group 130 is currently in a modified state. In response, the storage controller 110 reduces the match cost of the candidate container index 160 by a given cost amount (e.g., by 0.5).

Block 565 may include identifying additional candidate container indexes that are associated with journals in the journal group. Block 570 may include, for each additional candidate container index, adding the container index to the assessed list, and if the match cost of the container index is greater than zero, reducing the match cost of the container index. For example, referring to FIG. 1, the storage controller 110 identifies other journals 130 included in the journal group 120, and identifies the container indexes 160 that are associated with these other journals 130. Further, the storage controller 110 identifies a set of additional candidate container indexes 160 (i.e., in addition to the current container index 160, a set of other container indexes 160 that are also included in the candidate list 190) that are associated with the other journals 130. The storage controller 110 then reduces the match costs of the set of additional candidate container indexes 160. Further, the storage controller 110 adds the additional candidate container indexes 160 to the assessed list 195. After block 570, the example sub-process may return to block 540 (i.e., to process another candidate container index 160). Further, after all candidate container indexes 160 have been processed at block 540, the process may continue at block 575 (shown in FIG. 5C).

Referring now to FIG. 5C, blocks 575-595 may correspond generally to an example sub-process for performing a matching operation for a received data segment.

At block 575, a loop (defined by blocks 575-595) may be entered to process each container index in the ordered candidate list. Decision block 580 may include determining whether a match budget has been reached (i.e., the total accumulated match cost of the candidate container indexes that have been matched against has reached a maximum threshold). If the match budget has not been reached, then the example sub-process may continue at block 590, including performing matching of data units against the candidate container index. For example, referring to FIG. 1, the storage controller 110 iteratively processes each container index 160 included in the candidate list 190. For each iteration, the storage controller 110 determines whether the total match cost (i.e., the accumulated cost for the candidate container indexes 160 that have already been matched against) has reached a maximum match budget threshold. If the match budget has not yet been reached, the storage controller 110 matches the data units in the received data segment against the current container index 160. For example, the storage controller 110 can generate a fingerprint for each data unit of the segment, and then compare the generated fingerprint to the fingerprints included in the current container index 160. If a match is identified, then the storage controller 110 determines that a duplicate of the incoming data unit is already stored by the storage system 100. In response to this determination, the storage controller 110 stores a reference to the previous data unit (e.g., in a manifest 150) in deduplicated form, rather than storing a new copy of the incoming data unit.

Block 595 may include adding the match cost of the current container index to the total match cost. After block 595, the example sub-process may return to block 575 (i.e., to process another candidate container index). For example, referring to FIG. 1, the storage controller 110 sums or accumulates the match costs of the candidate container indexes 160 that have been matched against (i.e., at block 590). In some examples, the match cost of each candidate container index 160 is determined from a field or column of the candidate list 190 (shown in FIG. 4).

After returning to block 575, it may be determined at decision block 580 that the match budget has been reached. If so, the example sub-process may continue at block 585, including adding any remaining portion of the segment as new stored data units of the deduplication storage system. After all candidate container indexes 160 have been evaluated at block 575, the example sub-process may be terminated. For example, referring to FIG. 1, the storage controller 110 determines that the total match cost has reached the maximum match budget. In response to this determination, any remaining data units (of the data segment) are not matched against the candidate container indexes 160, but instead are stored as new data units in the deduplication storage system 100. In some implementations, the match budget may be specified or controlled to trade-off between the deduplication ratio and the consumed processing resources of the system.

Figure 6:
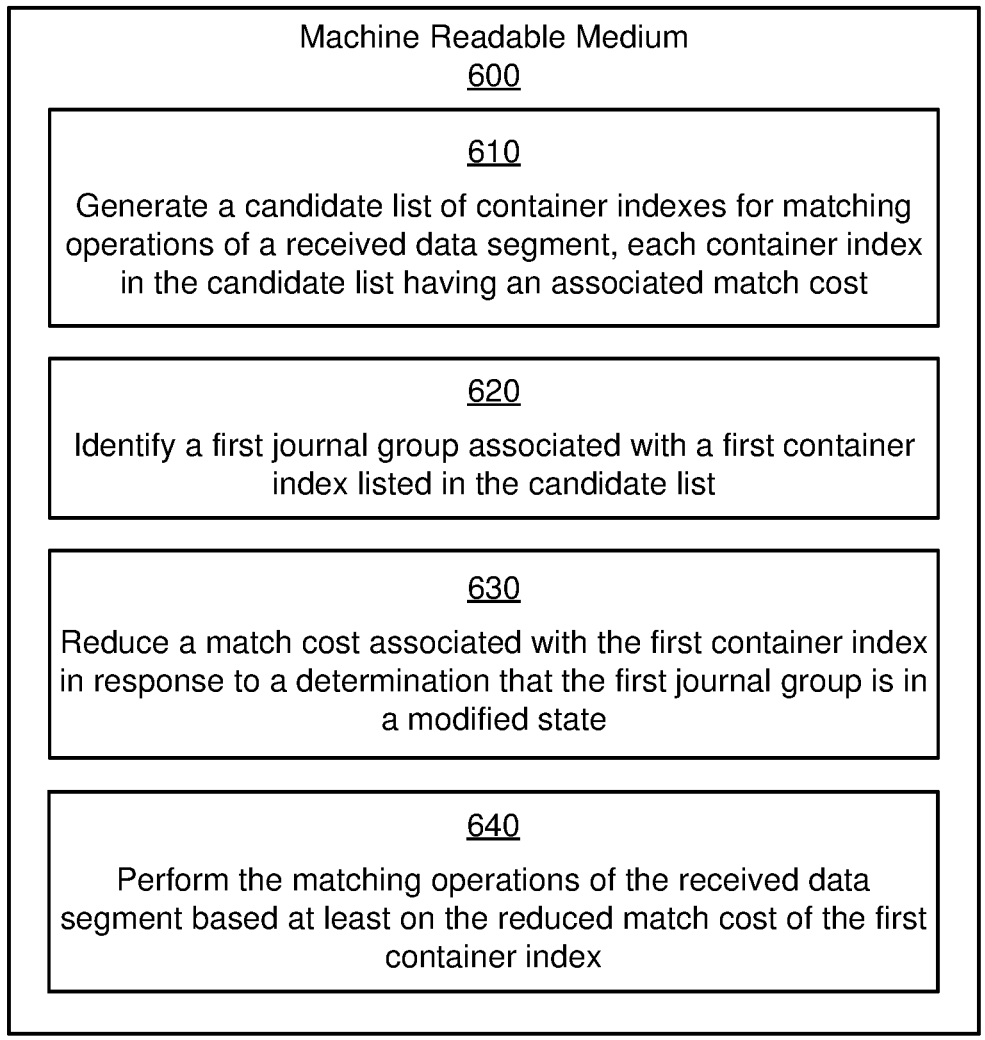
FIG. 6 is a diagram of an example machine-readable medium storing instructions in accordance with some implementations.

FIG. 6—Example Machine-Readable Medium

FIG. 6 shows a machine-readable medium 600 storing instructions 610-650, in accordance with some implementations. The instructions 610-650 can be executed by a single processor, multiple processors, a single processing engine, multiple processing engines, and so forth. The machine-readable medium 600 may be a non-transitory storage medium, such as an optical, semiconductor, or magnetic storage medium.

Instruction 610 may be executed to generate a candidate list of container indexes for matching operations of a received data segment, each container index in the candidate list having an associated match cost. Instruction 620 may be executed to identify a journal group associated with a first container index listed in the candidate list. Instruction 630 may be executed to reduce a match cost associated with the first container index in response to a determination that the identified journal group is in a modified state. Instruction 640 may be executed to perform a matching operation of the received data segment based at least on the reduced match cost of the first container index.

For example, referring to FIG. 1, the storage controller 110 receives an inbound data stream, and may divide the data stream into segments that each include multiple data units. The storage controller 110 identifies each container index 160 that is mapped to at least one hook point of the segment in the sparse index 180, counts the number of hook points that are mapped to each container index 160, and sorts the container indexes 160 according to the number of hook points. The storage controller 110 generates a candidate list 190 that includes the identified container indexes 160 sorted in decreasing order of the number of hook points. The storage controller 110 determines a match cost for each candidate container index 160 based on whether the candidate container index 160 is loaded in memory 115, and whether the candidate container index 160 is in a modified state.

Further, the storage controller 110 iteratively reads each candidate container index 160 in memory 115 to identify an associated journal 130, identifies a journal group 120 that includes the identified journal 130, and determines whether the journal group 130 is currently in a modified state. If so, the storage controller 110 reduces the match cost of the current candidate container index 160 by a given cost amount. The storage controller 110 also identifies a set of additional candidate container indexes 160 that are associated with other journals 130 in the journal group 120, and reduces the match costs of these additional candidate container indexes 160.

Furthermore, the storage controller 110 iteratively processes each container index 160 included in the candidate list 190. For each iteration, the storage controller 110 determines whether the total match cost (i.e., accumulated for the candidate container indexes 160 that have been already matched) has reached a maximum match budget threshold. If the match budget has not yet been reached, the storage controller 110 performs a matching operation of the received data segment to the current container index 160. Otherwise, if the match budget has been reached, the storage controller 110 does not match any remaining data units to the candidate container indexes 160, but instead stores the remaining data units as new data units in the deduplication storage system 100.

Figure 7:
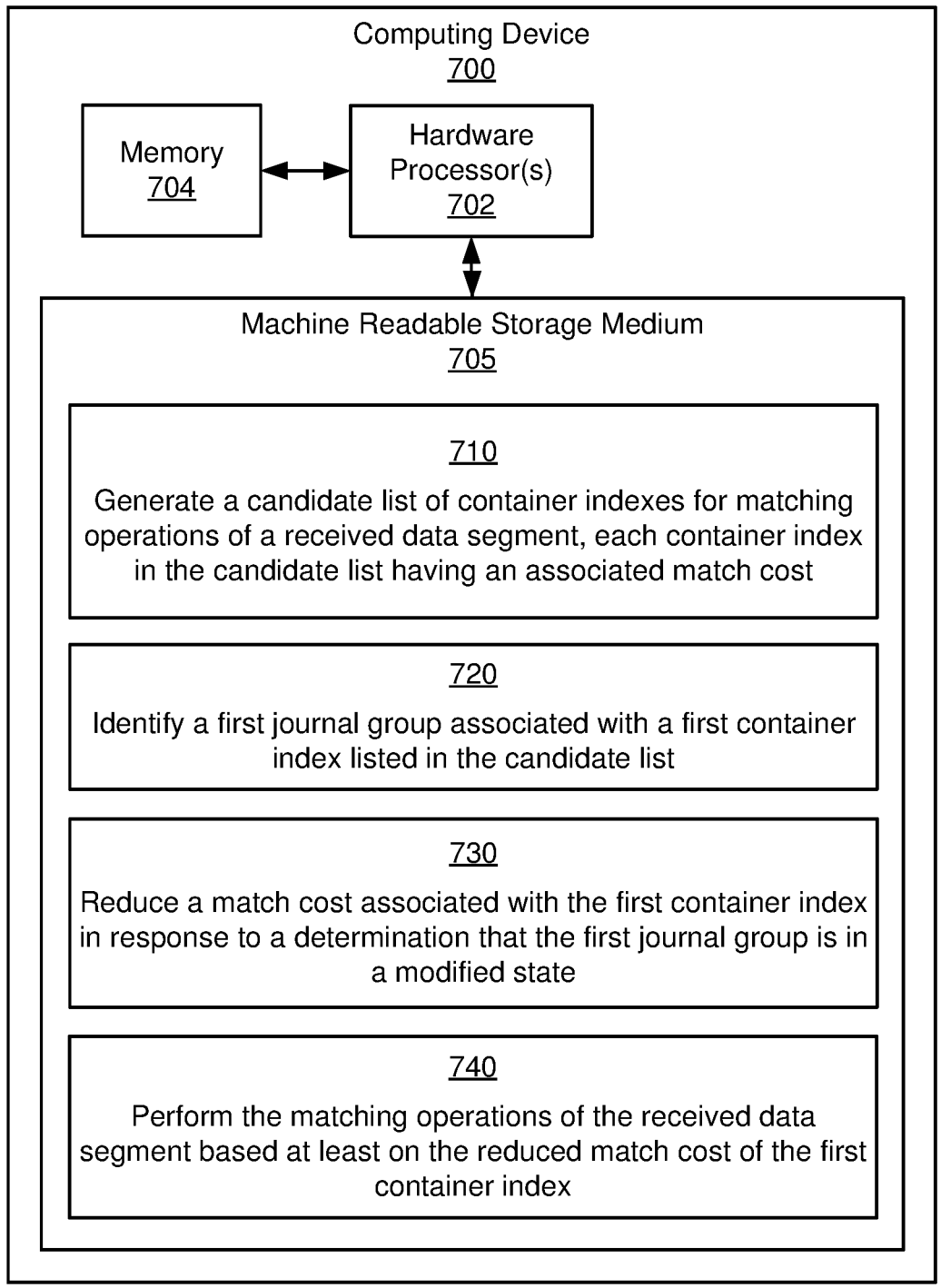
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the storage system 100 (shown in FIG. 1). As shown, the computing device 700 may include a hardware processor 702, a memory 704, and machine-readable storage 705 including instructions 710-740. The machine-readable storage 705 may be a non-transitory medium. The instructions 710-740 may be executed by the hardware processor 702, or by a processing engine included in hardware processor 702.

Instruction 710 may be executed to generate a candidate list of container indexes for matching operations of a received data segment, each container index in the candidate list having an associated match cost. Instruction 720 may be executed to identify a journal group associated with a first container index listed in the candidate list. Instruction 730 may be executed to reduce a match cost associated with the first container index in response to a determination that the identified journal group is in a modified state. Instruction 740 may be executed to perform a matching operation of the received data segment based at least on the reduced match cost of the first container index.

Figure 8:
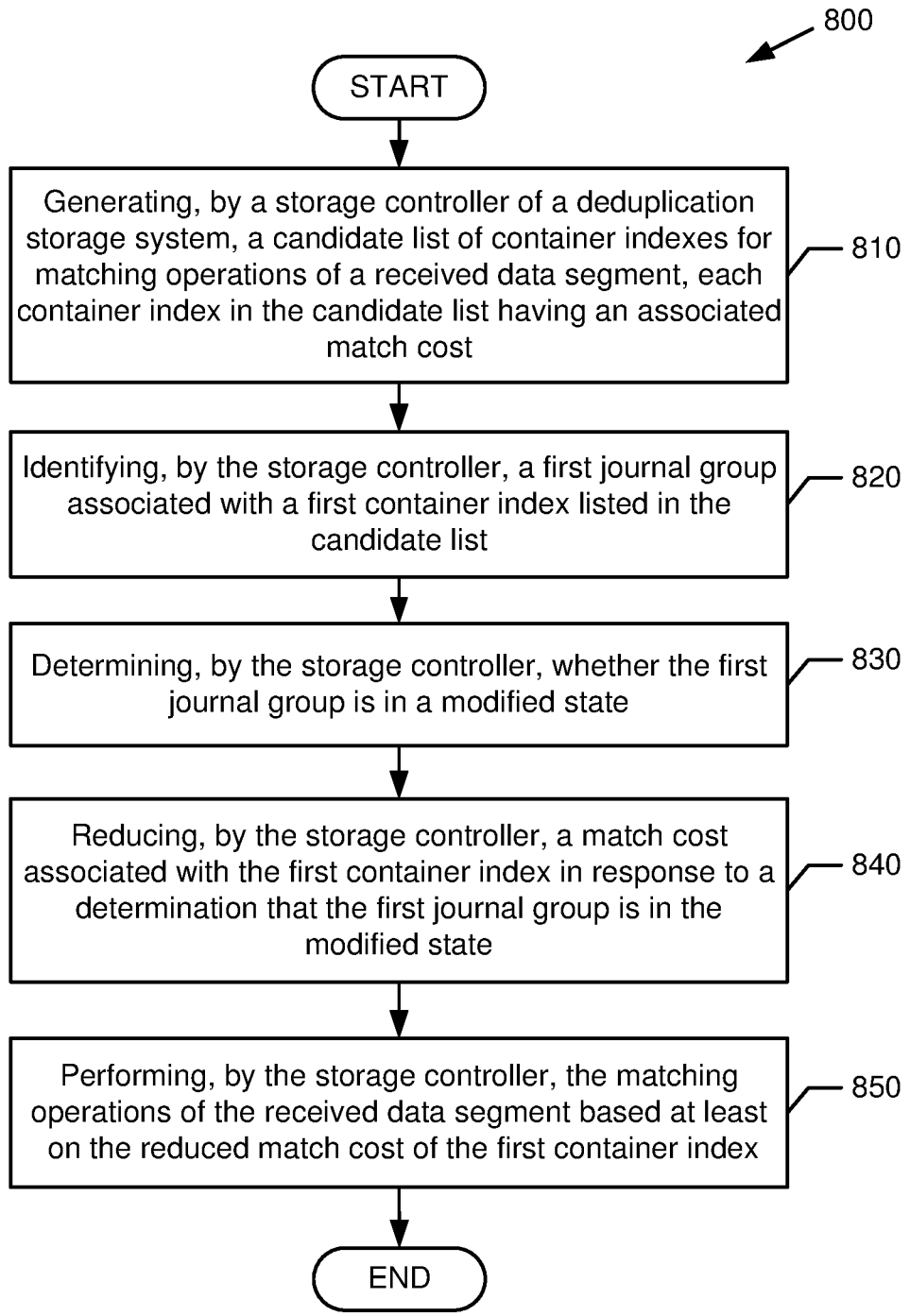
FIG. 8 is an illustration of an example process, in accordance with some implementations.

FIG. 8—Example Process

Referring now to FIG. 8, shown is an example process 800 in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-3, which show examples in accordance with some implementations. However, other implementations are also possible.

Block 810 may include generating, by a storage controller of a deduplication storage system, a candidate list of container indexes for matching operations of a received data segment, each container index in the candidate list having an associated match cost. Block 820 may include identifying, by the storage controller, a journal group associated with a first container index listed in the candidate list. Block 830 may include determining, by the storage controller, whether the identified journal group is in a modified state. Block 840 may include reducing, by the storage controller, a match cost associated with the first container index in response to a determination that the identified journal group is in the modified state. Block 850 may include performing, by the storage controller, a matching operation of the received data segment based at least on the reduced match cost of the first container index. After block 850, the process 800 may be completed.

In accordance with implementations described herein, a deduplication storage system may generate a candidate list of container indexes to be matched against a received data segment. The candidate list may be ordered according to the predicted number of matches of each candidate container index to the segment. Each candidate container index may be associated with a match cost that indicates a predicted processing cost for matching to that container index. In some implementations, the match cost of a candidate container index may be reduced in response to a determination that the candidate container index is associated with a journal group that is loaded in memory and is in a modified state. Accordingly, some implementations may provide matching costs that reflect the use of journal groups in the deduplication storage system. Further, in some implementations, the match scores of other candidate container indexes that are associated with the journal group may also be reduced. In this manner, the match costs of the additional container indexes may be adjusted based on the journal group, but without having to load each of the additional container indexes into memory. Accordingly, some implementations may improve the accuracy of the match costs without incurring additional performance costs.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
   a processor;
   a memory; and
   a machine-readable storage storing instructions, the instructions executable by the processor to:
   generate a candidate list of container indexes for matching operations of a received data segment, each container index in the candidate list having an associated match cost;
   identify a first journal group associated with a first container index listed in the candidate list;
   reduce a match cost associated with the first container index in response to a determination that the first journal group is in a modified state; and
   perform the matching operations of the received data segment based at least on the reduced match cost of the first container index.

2. The storage system of claim 1, including instructions executable by the processor to:
   receive the data segment to be stored in the storage system; and
   identify a set of hook points in the data segment using a sparse fingerprint condition.

3. The storage system of claim 2, including instructions executable by the processor to:
   compare the set of hook points to a sparse index to identify a set of container indexes;
   order the set of container indexes in decreasing number of matching hook points; and
   generate the candidate list from the ordered set of container indexes.

4. The storage system of claim 3, including instructions executable by the processor to:
   for each container index in the candidate list, determine the associated match cost based on a location and a state of the container index.

5. The storage system of claim 1, including instructions executable by the processor to:
   in response to a determination that the first container index is loaded in memory and is not included in an assessed list:
   read the first container index in memory to identify a journal associated with the first container index; and
   identify the first journal group that includes the identified journal.

6. The storage system of claim 5, including instructions executable by the processor to:
   determine a set of other journals that are included in the first journal group; and
   identify a set of additional container indexes that are associated with set of other journals and are included in the candidate list.

7. The storage system of claim 6, including instructions executable by the processor to:
   for each additional container index of the set of additional container indexes:
   reduce a match cost associated with the additional container index; and
   add an identifier of the additional container index to the assessed list.

8. The storage system of claim 1, including instructions executable by the processor to, for each container index in the candidate list:
   in response to a determination that a total match cost has not reached a match budget:
   perform a matching operation of the data segment against the container index; and
   add the associated match cost of the container index to a total match cost.

9. The storage system of claim 8, including instructions executable by the processor to, for each container index in the candidate list:
   in response to a determination that the total match cost has reached the match budget:
   store a remaining portion of the data segment as new stored data units of the storage system.

10. A method comprising:
    generating, by a storage controller of a deduplication storage system, a candidate list of container indexes for matching operations of a received data segment, each container index in the candidate list having an associated match cost;
    identifying, by the storage controller, a journal group associated with a first container index listed in the candidate list;
    determining, by the storage controller, whether the identified journal group is in a modified state;
    reducing, by the storage controller, a match cost associated with the first container index in response to a determination that the identified journal group is in the modified state; and
    performing, by the storage controller, the matching operations of the received data segment based at least on the reduced match cost of the first container index.

11. The method of claim 10, further comprising:
receiving the data segment to be stored in the storage system;
identifying a set of hook points in the data segment using a sparse fingerprint condition;
comparing the set of hook points to a sparse index to identify a set of container indexes;
ordering the set of container indexes in decreasing number of matching hook points; and
generating the candidate list from the ordered set of container indexes.

12. The method of claim 11, further comprising:
for each container index in the candidate list, determining the associated match cost based on a location and a state of the container index.

13. The method of claim 10, further comprising:
determining whether the first container index is loaded in memory and is not included in an assessed list;
in response to a determination that the first container index is loaded in memory and is not included in the assessed list:
reading the first container index in memory to identify a journal associated with the first container index; and
identifying the first journal group that includes the identified journal.

14. The method of claim 13, further comprising:
determining a set of other journals that are included in the first journal group; and
identifying a set of additional container indexes that are associated with set of other journals and are included in the candidate list;
for each additional container index of the set of additional container indexes:
reducing a match cost associated with the additional container index; and
adding an identifier of the additional container index to the assessed list.

15. The method of claim 10, further comprising, for each container index in the candidate list:
determining whether a total match cost has reached a match budget;
in response to a determination that the total match cost has not reached the match budget:
performing a matching operation of the data segment against the container index; and
adding the associated match cost of the container index to a total match cost.

16. A non-transitory machine-readable medium storing instructions that upon execution cause a processor to:
generate a candidate list of container indexes for matching operations of a received data segment, each container index in the candidate list having an associated match cost;
identify a journal group associated with a first container index listed in the candidate list;
reduce a match cost associated with the first container index in response to a determination that the identified journal group is in a modified state; and
perform the matching operations of the received data segment based at least on the reduced match cost of the first container index.

17. The non-transitory machine-readable medium of claim 16, including instructions that upon execution cause the processor to:
receive the data segment to be stored in the storage system;
identify a set of hook points in the data segment using a sparse fingerprint condition;
compare the set of hook points to a sparse index to identify a set of container indexes;
order the set of container indexes in decreasing number of matching hook points; and
generate the candidate list from the ordered set of container indexes.

18. The non-transitory machine-readable medium of claim 16, including instructions that upon execution cause the processor to:
in response to a determination that the first container index is loaded in memory and is not included in an assessed list:
read the first container index in memory to identify a journal associated with the first container index; and
identify the first journal group that includes the identified journal.

19. The non-transitory machine-readable medium of claim 18, including instructions that upon execution cause the processor to:
determine a set of other journals that are included in the first journal group; and
identify a set of additional container indexes that are associated with set of other journals and are included in the candidate list;
for each additional container index of the set of additional container indexes:
reduce a match cost associated with the additional container index; and
add an identifier of the additional container index to the assessed list.

20. The non-transitory machine-readable medium of claim 16, including instructions that upon execution cause the processor to:
in response to a determination that a total match cost has reached a match budget:
perform a matching operation of the data segment against the container index; and
add the associated match cost of the container index to a total match cost.

* * * * *